United States Patent
Ho et al.

(10) Patent No.: US 9,577,705 B2
(45) Date of Patent: Feb. 21, 2017

(54) NETWORK APPARATUS WITH MULTIPLE COMMUNICATION PORTS

(71) Applicant: REALTEK SEMICONDUCTOR CORP., Hsinchu (TW)

(72) Inventors: Hsuan-Ting Ho, Hsinchu (TW); Liang-Wei Huang, Hsinchu (TW); Sheng-Fu Chuang, Hsinchu (TW); Ching-Yao Su, Hsinchu (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 297 days.

(21) Appl. No.: 14/527,224

(22) Filed: Oct. 29, 2014

(65) Prior Publication Data

US 2015/0117635 A1 Apr. 30, 2015

(30) Foreign Application Priority Data

Oct. 29, 2013 (TW) .............................. 102139112 A (51) Int. Cl.
*H04B 3/23* (2006.01)
*H04B 3/32* (2006.01)

(52) U.S. Cl.
CPC . *H04B 3/23* (2013.01); *H04B 3/32* (2013.01)

(58) Field of Classification Search
None
See application file for complete search history.

(56) References Cited

U.S. PATENT DOCUMENTS

| 2009/0154355 A1* | 6/2009 | Diab ........................ H04L 47/10 370/236 |
| 2009/0154536 A1* | 6/2009 | Agazzi ..................... H04B 3/23 375/220 |
| 2012/0011217 A1* | 1/2012 | Weng ..................... H04J 3/0641 709/209 |
| 2013/0114390 A1 | 5/2013 | Chu et al. |

FOREIGN PATENT DOCUMENTS

| CN | 101488780 | 7/2009 |
| TW | 200843367 | 11/2008 |
| WO | 9946867 | 9/1999 |

* cited by examiner

Primary Examiner — Fan Tsang
Assistant Examiner — Jeffrey Lytle
(74) Attorney, Agent, or Firm — WPAT, PC; Justin King (57) ABSTRACT

This disclosure provides a network apparatus with communication ports, each connected to multiple channels, assigned a seed for eliminating the interference among the communication ports, and operable in a master or slave mode, each channel having a communication unit which comprises: an echo canceller, a near-end crosstalk (NEXT) canceller, a decision feedback equalizer, and a control unit configured for controlling the communication ports if the echo canceller and the decision feedback equalizer keep updating their filter coefficients according to the same symbol during a first pre-determined time-interval; wherein when more than two of the communication ports operate in the master mode, the control unit assigns different seeds to the more than two communication ports; and wherein when successive two of the communication ports operate in the slave mode, the control unit stops either the echo canceller or the NEXT canceller from updating their filter coefficients during a second pre-determined time-interval.

6 Claims, 7 Drawing Sheets

NETWORK APPARATUS WITH MULTIPLE COMMUNICATION PORTS

This application claims the benefit of Taiwan application Serial No. 102139112, filed Oct. 29, 2013, the disclosure of which is incorporated by reference herein in its entirety.

TECHNICAL FIELD

The present disclosure relates to a network apparatus with multiple communication ports, and more particularly to an apparatus and the corresponding method that can perform cancelling of the cross clock domain interference.

TECHNICAL BACKGROUND

In the conventional communication system, the Farrow structure is usually used to process the interpolating calculation during the interference cancellation of cross clock domain, so as to transform corresponding data among different clock domains. In the art, the Farrow structure is a polynomial-based interpolation filter which can alleviate the complexity of the interpolating calculation. However, the application of the polynomial approximation would lead to an inevitable computational errors or bias. In general the maximum computational error will appear when the phase angle is at 180 degrees. Also, as the clocks of input and output data get closed to each other, the Farrow structure would have a downgrading performance and the computational error would rise up. In particular, when the two clocks are almost the same for the input and output data, a correcting computation to obtain interpolated data having 180-degree phases is extremely impossible from a Farrow-structure scheme.

For example, in the application of HDMI Ethernet channel, due to the feature of bi-direction transmission in a single cable, interference may arise from the incoming signals and the echo of the outgoing signals. In the art, an echo canceller is usually introduced to perform the cancellation of the echoes. Because a small clock difference of less than about 200 ppm may exist between the opposing ends of the HDMI Ethernet channel, the data at the local transmitter end needs to undergo clock domain switching to transform its clock domain into that of the data at the local receiver end, and then the echo canceller can be applied to depress the possible echoes according to the clock domain of the receiver end. Here, if the Farrow structure is introduced to process the clock domain switching, the interpolating accuracy would be poor due to the clock difference between the transmitter end and the receiver end. Thus, to obtain a satisfied computational precision from the Farrow structuring, a high-order polynomial is inevitable, but trade-off is a large number of taps in the Farrow structure. As a result, the computational complexity is high and the time delay in signaling is usually prolonged.

In a network apparatus with multiple communication ports, one port is often interfered by the other one. For example, to reduce the production cost, a transformer of a multi-port switch often has coils of two or four ports wrapped together in the same element. The internal coils of the transformer make signals interfere with each other, and this would downgrade signaling performance due to interference between the neighboring ports. Therefore, it is in need to develop a new technique to eliminate the cross-clock-domain interference between different communication ports in a network apparatus.

TECHNICAL SUMMARY

One of main purposes of the present disclosure is to solve the problem of cross-clock-domain interference between communication ports.

According to one aspect of the present disclosure, one embodiment provides a network apparatus with multiple communication ports, each of which is connected to multiple channels, assigned a seed for eliminating the interference among the communication ports, and operable in either a master mode or a slave mode, each of the channels having a communication unit which comprises: an echo canceller being a first filter with multiple taps corresponding to multiple first coefficients so as to eliminate the interference of an echo signal from the channel itself; a near-end crosstalk (NEXT) canceller being a second filter with multiple taps corresponding to multiple second coefficients so as to eliminate the interference of crosstalk noise from another channel of the communication port itself; a decision feedback equalizer being a third filter with multiple taps corresponding to multiple third coefficients so as to eliminate the inter-symbol interference due to the transmission of far-end signals; and a control unit configured for controlling the communication ports if the echo canceller keeps updating the first coefficients and the decision feedback equalizer keeps updating the third coefficients according to the same symbol during a first pre-determined time interval; wherein when more than two of the communication ports operate in the master mode, the control unit assigns different seeds to the more than two communication ports; and wherein when successive two of the communication ports operate in the slave mode, the control unit stops either the echo canceller from updating the first coefficients or the NEXT canceller from updating the second coefficients during a second pre-determined time interval.

According to another aspect of the present disclosure, another embodiment provides a network apparatus with multiple communication ports, each of which is only connected to one channel, assigned a seed for eliminating the interference among the communication ports, and operable in either a master mode or a slave mode, each of the channels having a communication unit which comprises: an echo canceller being a first filter with multiple taps corresponding to multiple first coefficients so as to eliminate the interference of an echo which is a returned signal of a transmitted signal in the same communication port; a decision feedback equalizer being a third filter with multiple taps corresponding to multiple third coefficients so as to eliminate the inter-symbol interference due to the transmission of far-end signals; and a control unit configured for controlling the communication ports if the echo canceller keeps updating the first coefficients and the decision feedback equalizer keeps updating the third coefficients according to the same symbol during a first pre-determined time interval; wherein when more than two of the communication ports operate in the master mode, the control unit assigns different seeds to the more than two communication ports; wherein when successive two of the communication ports operate in the slave mode, the control unit stops the echo canceller from updating the first coefficients during a second pre-determined time interval; and wherein when one of the two neighboring communication ports operates in the master mode and the other one operates in the slave mode, the control unit stops the decision feedback equalizer from updating the third coefficients during a third pre-determined time interval.

According to another aspect of the present disclosure, another embodiment provides a network apparatus with multiple communication ports, each of which is connected to a transmitting channel and a receiving channel and assigned a seed for eliminating the interference among the communication ports, each of the channels having a communication unit which comprises: a NEXT canceller being a first filter with multiple taps corresponding to multiple first coefficients so as to eliminate the interference of noise signals from the other channel of the communication port itself; a cross-port cross talk canceller being a second filter with multiple taps corresponding to multiple second coefficients so as to eliminate the interference of noise signals from the channels of the other communication ports; a decision feedback equalizer being a third filter with multiple taps corresponding to multiple third coefficients so as to eliminate the inter-symbol interference due to the transmission of far-end signals; and a control unit configured for assigning different seeds to the communication ports and stopping the decision feedback equalizer from updating the third coefficients during a second pre-determined time interval when either the NEXT canceller keeps updating the first coefficients or the cross-port cross talk canceller keeps updating the second coefficients and the decision feedback equalizer keeps updating the third coefficients according to the same symbol during a first pre-determined time interval.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings which are given by way of illustration only, and thus are not limitative of the present disclosure and wherein.

DESCRIPTION OF THE EXEMPLARY EMBODIMENTS

For further understanding and recognizing the fulfilled functions and structural characteristics of the disclosure, several exemplary embodiments cooperating with detailed description are presented as the following. Reference will now be made in detail to the preferred embodiments, examples of which are illustrated in the accompanying drawings. In the following description of the embodiments, it is to be understood that although the terms "first", "second" and "third" are used to describe various elements, these elements should not be limited by the term. Also, unless otherwise defined, all terms are intended to have the same meaning as commonly understood by one of ordinary skill in the art.

Figure 1:
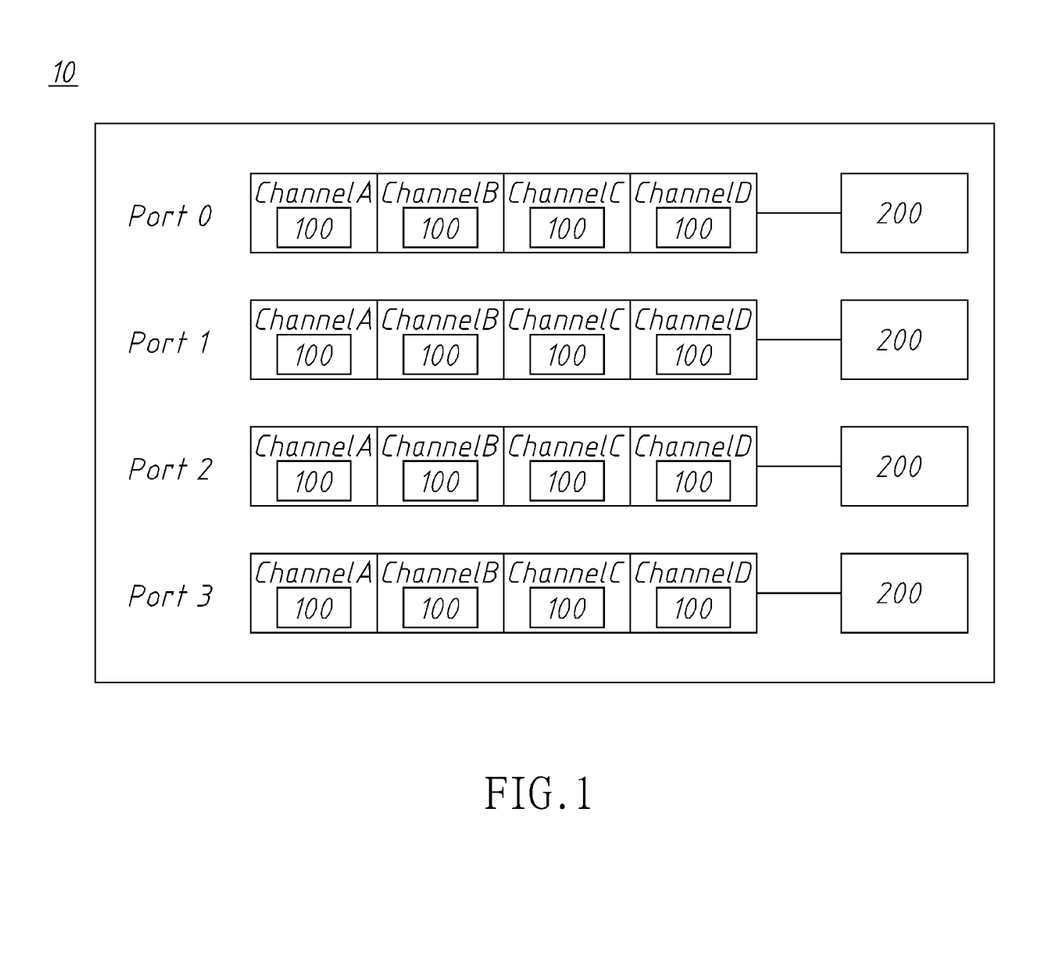
FIG. 1 shows a block diagram of a network apparatus according to an embodiment of the present disclosure.

FIG. 1 schematically shows a block diagram of a network apparatus 10 according to an embodiment of the present disclosure. The network apparatus 10 has multiple communication ports, and each communication port is connected to at least one channel. As shown in FIG. 1, four communication ports 0, 1, 2 and 3 are provided in the network apparatus 10 and four channels A, B, C and D can be connected to each of the communication ports 0, 1, 2 and 3. For each channel, a communication unit 100 is provided in the channel to perform the operations of transmitting and receiving signals. The communication unit 100 is connected to a control unit 200, which is configured for controlling the communication unit 100 so as to eliminate the cross-clock-domain interference between different communication ports.

Figure 2:
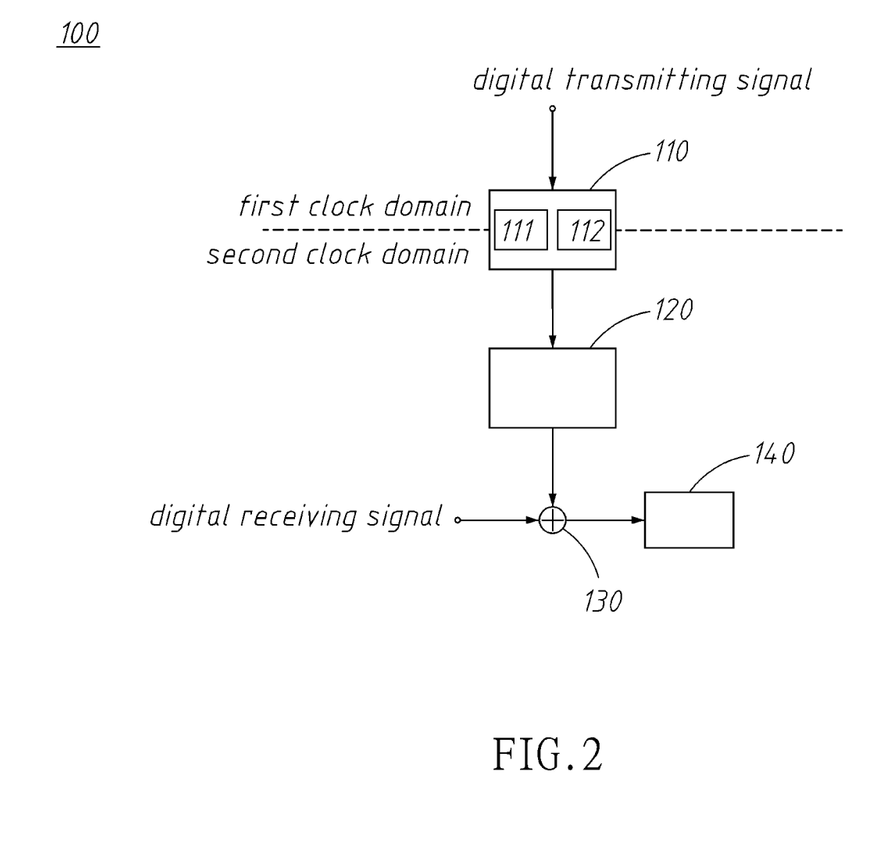
FIG. 2 shows a block diagram of a communication unit according to an embodiment of the present disclosure.

FIG. 2 schematically shows a block diagram of a communication unit 100 according to an embodiment of the present disclosure. The communication unit 100 may act as a transmitter operating in a first clock domain and as a receiver operating in a second clock domain. The communication unit 100 is applicable to a communication system for eliminating possible interference during the signal transmission and reception. Somehow, a noise may be introduced into the transmitter operating at a first clock frequency, i.e. in the first clock domain, and the receiver would calculate to get a second clock frequency (in the second clock domain) at which its corresponding transmitter operates by using the timing recovery mechanism. If the first and second clock domains are not attributed to the same loop timing but to different clock domains, elimination of the cross-clock-domain interference is required in the art. During a normal signal transmission and reception process of the communication unit 100, the transmitted signal from the transmitter may cause particular interference at the receiver. For instance, in the case that the transmitter and the receiver are located at the same side of a channel, an echo of a signal sent by the transmitter would be received by the receiver through the channel. In the case that the transmitter and the receiver are located at different channels, the receiver might be interfered by the cross-talk caused by the response signal of the receiver itself to the transmitted signal from the transmitter. For a network apparatus with the function of interference cancellation, it can generate a corresponding cancelling signal according to the transmitted signal from the transmitter so as to cancel the interference included in the received signal of the receiver. Because the transmitted signal and the received signal are respectively attributed to the first and second clock domains, the control unit 200 needs to be combined with the communication unit 100, as shown in FIG. 1, to perform the task of cross-clock-interference cancellation.

As shown in FIG. 2, the communication unit 100 includes a first-in-first-out (FIFO) circuit 110, a cancelling signal generator 120, an adder 130, and a decision feedback equalizer 140. The FIFO circuit 110 can receive a digital transmitting signal in the first clock domain and output a digital transmitting signal in the second clock domain according to an accumulated timing error between the first clock domain and the second clock domain. The FIFO circuit 110 is mainly used to control the order sequence and the rate of the digital transmitting signals, but not to process their magnitudes. In particular, the FIFO circuit 110 can adjust the output format of the digital transmitting signal for clock domain switching according to the accumulated timing difference between the input clock domain (i.e. the first clock domain) and the output clock domain (i.e. the second clock domain). Details thereabout would be further elucidated in the following sections.

The cancelling signal generator 120 can generate a cancelling signal for cancelling an interference signal received by the receiver according to the digital transmitting signal outputted by the FIFO circuit 110. The interference signal is generated in response to the digital transmitting signal. In particular, the cancelling signal generator 120 can calculate a phase difference between the interference signal and the cancelling signal and can further adjust the cancelling signal accordingly so as to reduce or diminish the phase difference. Because the receiver can simultaneously receive the interference signal and the data sent from a communication party (i.e. the interference signal forms a part of a digital receiving signal of the receiver), the communication unit 100 has the adder 130 coupled to the cancelling signal generator 120 and a signal-receiving path of the receiver, such that the cancelling signal can be subtracted from the digital receiving signal before a signal output is performed. The cancelling signal generator 120 may include an echo canceller, a near-end cross talk (NEXT) canceller, a cross-port NEXT canceller, or the combination thereof. The echo canceller is used to eliminate the interference of an echo signal from the channel itself, the NEXT canceller is used to eliminate the interference of crosstalk noise from another channel of the communication port itself, and the cross-port NEXT canceller is used to eliminate the interference of crosstalk noise from another communication port. The above cancellers can be implemented based on the circuit structures of adaptive filter. For instance, the echo canceller can be a first filter with multiple taps corresponding to multiple first coefficients, and the NEXT canceller can be a second filter with multiple taps corresponding to multiple second coefficients. In an exemplary embodiment, each of the echo canceller and the NEXT canceller may be composed of a finite-impulse-response (FIR) filter. Furthermore, the decision feedback equalizer 140 may be coupled to the adder 130 to receive the digital receiving signal in which the interference has been cancelled and to eliminate the inter-symbol-interference (ISI) caused during transmission of the digital receiving signal from the far end to the near end. The decision feedback equalizer 140 can be a third filter with multiple taps corresponding to multiple third coefficients. And in an exemplary embodiment, the decision feedback equalizer 140 may be composed of a FIR filter and an infinite-impulse-response (IIR) filter.

The process of the interference cancellation across different clock domains can be divided into two parts in the embodiments. If the digital transmitting signal as shown in FIG. 2 includes a plurality of consecutive symbols or sampled points in the first clock domain, then each of the symbols can be treated as an integer point along a corresponding time axis, and the interval between two adjacent points can be defined as a clock period of the first clock domain. When clock domain of the digital transmitting signal is converted from the first clock domain to the second clock domain, each of the symbols would deviate from the original integer point along the time axis to be a non-integer point. By introducing the communication unit 100 of the present disclosure, the non-integer point along the time axis in the second clock domain can be divided into an integral portion and a decimal portion. For example, if a certain symbol point is located at x.y (where x and y denote the digitals of the integral portion and the decimal portion, respectively), then the "x.y" would be separated into an x portion and a 0.y portion. Firstly, to process the integral portion x, the FIFO circuit 110 outputs the original integer point of x in the first clock domain at a non-integer time point of x.y, according to the rate of the second clock domain. Due to the rate difference between the first and the second clock domains, the FIFO circuit 110 needs to evaluate the accumulated timing difference in between and so as to output more symbols in a single relevant time (when the first clock domain is faster than the second clock domain), or to skip an output timing by having no symbol output (when the first clock domain is slower than the second clock domain). Further, at this timing, since the decimal portion is yet to be processed, a phase difference may exist between the cancelling signal and the interference signal, in which the cancelling signal is generated by the cancelling signal generator 120 in response to the output of the FIFO circuit 110. According to the phase difference, the cancelling signal generator 120 would apply a fast-convergent adaptive algorithm to hunt down the interference signals with various phases so as to locate the signal to be cancelled. Upon such an arrangement, the phase difference can be rapidly reduced, and thereby possible bias caused by the raw decimal portion as well as the cross clock domain interference can be eliminated. For example, by using the least mean square (LMS) algorithm or the recursive least squares (RLS) algorithm, the cancelling signal generator 120 can track the interference signals with various phases, so as to update the coefficients of the adaptive filter in the cancelling signal generator 120. To assure the accuracy and a rapid convergent speed, computational step size for either the LMS algorithm or the RLS algorithm shall be relevantly adjusted according to the phase difference between the cancelling signal and the interference signal.

To further eliminate the interference among the communication ports, each of the communication ports can be assigned a seed that makes the channels in each communication port have the same seed. The seed has a cycle. For example, a seed may be selected from an initial value of a register (e.g., an 11-bit register). The initial value of the register is thus a Pseudo-Noise (PN) sequence having a 2047-bit length as well as periodicity, where the PN sequence cycles per 2047 bits. In other words, the cycle of the seed is 2047. In addition, a transmission signal is generated after logic operations are performed upon the seed and the data stream. Therefore, by utilizing the cycle characteristics of the seed, the control unit 200 functions by referring to the time distance between the seeds of the adjacent communication ports.

In the following, an example is given to describe how the control unit 200 works. The communication port 0 is assigned a first seed and the communication port 1 is assigned a second seed. When a time distance between the first seed and the second seed is less than a threshold value, implying that the first seed is going to overlap with the second seed, it is unable to determine precisely whether the signal to be eliminated is generated from the communication port 0 or the effect of the adjacent communication port 1 on the communication port 0. Hence, the control unit 200 may stop updating the coefficients of the NEXT canceller and enable the cross-port NEXT canceller. On the other hand, when a time distance between the first seed and the second seed is larger than a threshold value, implying that the first seed is going to leave away from the second seed, the control unit 200 may re-enable a coefficient updating mechanism of the NEXT canceller.

As shown in FIG. 2, the FIFO circuit 110 may include a synchronous FIFO unit 111 and an asynchronous FIFO unit 112. The synchronous FIFO unit 111 receives the digital transmitting signal including a plurality of symbols in the first clock domain and temporarily stores a part of the above symbols, to be used by the asynchronous FIFO unit 112. The asynchronous FIFO unit 112 may perform one of the following output processes in each clock of the second clock domain, based on an accumulated timing difference between the first clock domain and the second clock domain: outputting one of the symbols (in normal situation), outputting consecutive two of the symbols ("adding output", which outputs one symbol more, compared with the normal situation), and outputting no symbol ("skipping output", which outputs one symbol less, compared with the normal situation). If the accumulated timing difference between the first and second clock domains is less than a clock period (i.e. less than a symbol interval), the asynchronous FIFO unit 112 would retrieve regularly a symbol from the synchronous FIFO unit 111. Namely, neither "adding output" nor "skipping output" is needed. If the first clock domain is faster than the second clock domain and the accumulated timing difference reaches a clock period (i.e. as the second clock domain is lagged by a symbol interval), the asynchronous FIFO unit 112 would retrieve two consecutive symbols at a time from the synchronous FIFO unit 111 so as to catch up the first clock domain. Further, if the first clock domain is slower than the second clock domain and the accumulated timing difference reaches a clock period (i.e. as the second clock domain is advanced by a symbol interval), the asynchronous FIFO unit 112 would retrieve no symbol from the synchronous FIFO unit 111 so as to have the first clock domain to catch up.

As shown in FIG. 2, the communication unit 100 may have a function for detecting the timing difference between the first and the second clock domains. The operation is described below in detail. If the receiving clock of local end is slower that the transmitting clock of corresponding remote end, the receiving clock can be speeded up; otherwise, the receiving clock can be slowed down. Thus, the transmitting clock of corresponding remote end can be locked in. Upon such an arrangement, the cancelling signal generator 120 may be equipped with a timing accumulator (not shown) to accumulate the counting number of speeding up or slowing down, according to the detection result. As the counting number reaches a value standing for the situation of advancing a clock period or a symbol interval, the timing accumulator would inform the asynchronous FIFO unit 112 to perform the skip outputting. On the other hand, if the counting number reaches a value standing for the situation of lagging a clock period or a symbol interval, the timing accumulator would inform the asynchronous FIFO unit 112 to perform the adding outputting. In one embodiment, the timing accumulator is a phase accumulator, and the accumulated timing difference is an accumulated phase difference. For example, a 64-phase phase-look loop (PLL) can be used to implement the phase accumulator. If the counting number in the phase accumulator reaches 64 in advancing situation or in lagging situation, the asynchronous FIFO unit 112 would be informed to perform the skipping outputting or the adding outputting respectively. In another embodiment, the timing accumulator is a frequency accumulator, and the accumulated timing difference is an accumulated frequency difference. For example, a voltage-controlled oscillator (VCO) can be used to implement the frequency accumulator. Then, adjusting in frequency can be calculated or mapped into corresponding adjusting in phase and thus the critical or the threshold counting number for performing the skipping or the adding outputting in the frequency accumulator can be determined.

Figure 3A:
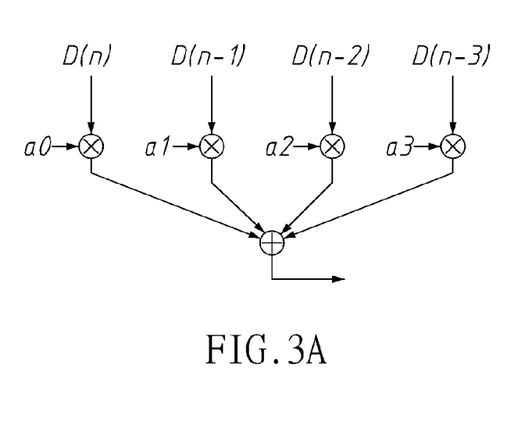
FIG. 3A to 3D show an FIR filter with four symbol values at corresponding taps, and its operations of adding output and skipping output.
Figure 3B:
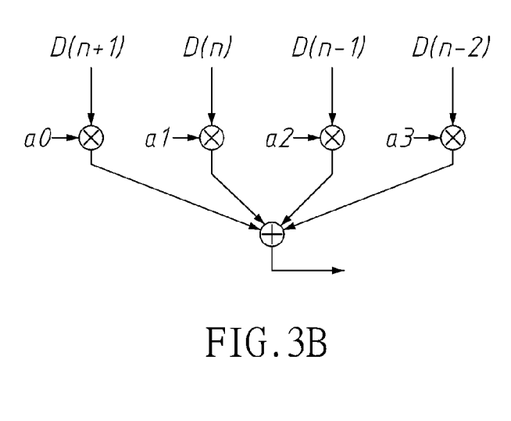
Figure 3C:
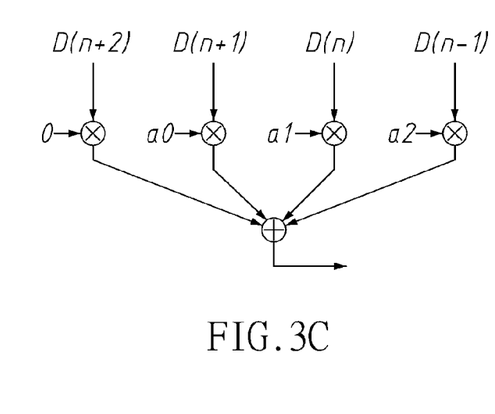
Figure 3D:
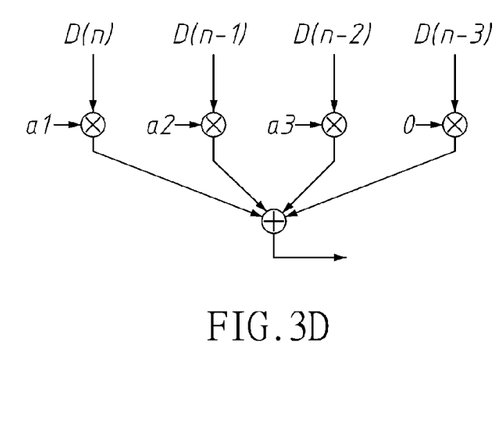

In one embodiment, the cancelling signal generator 120 (such as a echo canceller or a NEXT canceller) is a filter having a plurality of taps, and the relationship between the coefficient of each tap and the corresponding symbol of the digital transmitting signal is adjusted according to the output pattern of the asynchronous FIFO unit 112 so as to keep substantially the time continuity. Give an example of an FIR filter as the cancelling signal generator 120 to have four taps, with four symbol values at corresponding taps being denoted as D(n), D(n−1), D(n−2) and D(n−3), respectively, and four coefficients for the corresponding taps being denoted as a0, a1, a2 and a3, as shown in FIG. 3A. If neither the adding output nor the skipping output is performed, a new symbol value D(n+1) would appear as normally expected at the next timing, and the oldest symbol value D(n−3) would be abandoned simultaneously. To maintain the continuity in relationship between the coefficients and the symbol values of the taps, the coefficients for the taps are kept in order as the same a0, a1, a2 and a3, as shown in FIG. 3B. If an abnormal situation happens in the next timing to require an adding output, then the symbol values for the taps become D(n+2), D(n+1), D(n) and D(n−1). Namely, two symbol values D(n+1) and D(n+2) are obtained at the same timing. However, to keep the related continuity, coefficients of the taps are advanced by a tap to become 0, a0, a1 and a2 ("0" is appeared due to the D(n+2) is additional without generating a new coefficient for the corresponding tap), as shown in FIG. 3C. On the other hand, if the abnormal situation happens in the next timing to require a skipping output, then the symbol values for the taps become D(n), D(n−1), D(n−2) and D(n−3). Namely, no new symbol value is added. At this time, coefficients of the taps are shifted backward by a tap to become a1, a2, a3 and 0 ("0" is appeared due to the D(n−3) is to be abandoned normally), as shown in FIG. 3D.

Another aspect of the present invention that can still hold the aforesaid related continuity is to maintain the coefficients of the taps but shifting the symbol values adequately. For example, if an adding output is needed, the symbol values in FIG. 3A are advanced by a tap, and the vacancy formed by kicking off the D(n) is now filled by the new symbol value D(n+1), and another new symbol value D(n+2) directly overwrite the original D(n−2) vacancy with resetting 0 to the corresponding coefficient of the tap, as shown in FIG. 3A. It is noted that the scheme provided by FIG. 3C can be obtained in FIG. 3A. On the other hand, if a skipping output is needed, all the symbol values in FIG. 3A are shifted by advancing a tap, the old leading sampled value D(n−3) is shifted back to the old D(n) vacancy, and the coefficient of the tap corresponding to the D(n−3) is now reset to 0 as shown in FIG. 3B. It is also noted that the scheme provided by FIG. 3D can now be obtained in FIG. 3B.

In the above operations of eliminating the cross-clock domain interference, if there are more than two filters (including cancellers and equalizers) updating or training their own coefficients according to the same symbols for a time interval, then mutual interferences between the coefficients of the cancellers or equalizers would be induced. This would further cause that the filters cannot train their coefficients properly and the corresponding sequence may fail to converge, which is also referred to as "seed collision". For example, if the communication unit 100 of the present disclosure is applied to the HEAC (HDMI Ethernet & Audio return Channel), its echo canceller and decision feedback equalizer may update their own coefficients according to the same symbols for a seed-collision time interval, causing an unstable convergence. To fix such kind of seed collision, the control units 200 of FIG. 1 are used to suspend the coefficient updating of the most stable one among the cancellers and equalizers, so as to solve the seed-collision problem. Some embodiments are provided below.

Figure 4:
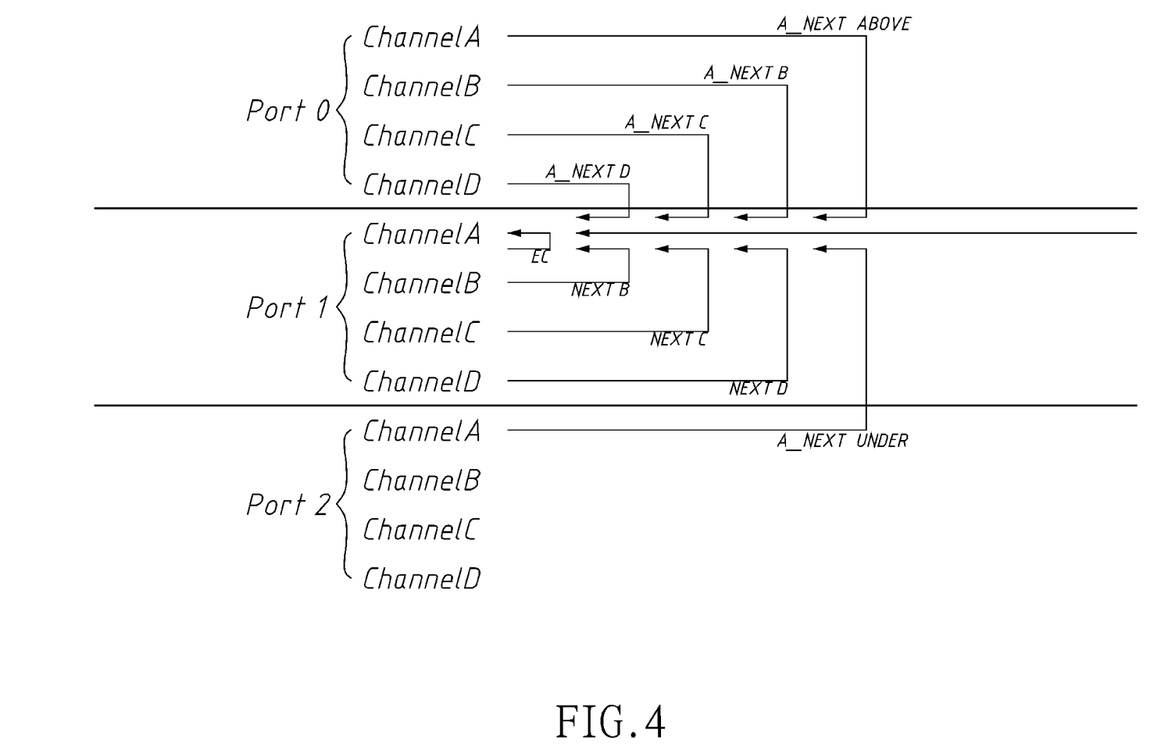
FIG. 4 shows a schematic diagram of possible interference sources in a multi-port Gigabit Ethernet network apparatus.

In a first embodiment, the network apparatus 10 of the present disclosure can be applied to the multi-port Gigabit Ethernet network. The network apparatus 10 may have four communication ports (Port 0, 1, 2 and 3, as shown in FIG. 1). Each of the communication ports can operate in either a master mode or a slave mode. FIG. 4 shows a schematic diagram of possible interference sources in the network apparatus 10, taking Channel A of Port 1 for example. The interference may come from either the communication ports of near end or the noise signals transmitted from the far ends. As shown in FIG. 4, EC denotes echo interference that is the interference caused by an echo signal from the communication port itself, e.g. the signal transmitted from Channel A of Port 1 may be partly returned to the same channel (Channel A of Port 1) to be the above-recited "echo signal", which would be a noise to interfere in the same channel. NEXT B, C and D denote near-end cross-talk (NEXT) interference that is the interference of noise signals from the other channels (Channel B, C and D) of the same port (Port 1), e.g. the signals transmitted from Channel B, C and D of Port 1 may respectively cause undesirable cross-talk noises to interfere in Channel A of the same port at the same end of the system. A_NEXT A ABOVE/UNDER and A_NEXT X denote cross-port NEXT interference that is the interference of noise signals from the channels ("X" can be Channel B, C and D) of the other ports (Port 0 and 2), e.g. the signals transmitted from Channel A, B, C and D of Port 0 and 2 may respectively cause undesirable cross-talk noises to interfere in Channel A of Port 1 at the same end of the system. FE denotes the inter-symbol interference due to the transmission of far-end signals, e.g. the signals transmitted from the other ends of the system, being inter-symbol interfered during their transmission from the other ends to the current end. Since each of the communication ports is operable in two modes, either in a master mode or in a slave mode, we may have eight possible operation-mode combinations for three neighboring ports (Port 0, 1 and 2) as shown in FIG. 4. In the following paragraphs, solutions to fix the seed-collision problem are described in detail according to operation modes of Port 0, 1 and 2.

(1) If all of Port 0, 1 and 2 operate in the master mode, the control unit 200 would assign different seeds to each of Port 0, 1 and 2 when the network apparatus 10 is turned on, so as to avoid seed collision at the very beginning.

(2) If both Port 0 and 1 operate in the master mode and Port 2 operates in the slave mode, the control unit 200 would assign different seeds to Port 0 and 1 when the network apparatus 10 is turned on, so as to avoid seed collision at the very beginning. Also, when the seed collision between A_NEXT A ABOVE (the cross-port NEXT interference from Channel A of Port 2) and FE (the inter-symbol interference during the transmission of signals from the far end) happens, the control unit 200 would stop the decision feedback equalizer of Port 1 from updating its filter coefficients because the decision feedback equalizer has a relatively stable response.

(3) If both Port 0 and 2 operate in the master mode and Port 1 operates in the slave mode, the control unit 200 would assign different seeds to Port 0 and 2 when the network apparatus 10 is turned on, so as to avoid seed collision at the very beginning. When the seed collision between A_NEXT A ABOVE (the cross-port NEXT interference from Channel A of Port 2) and FE (the inter-symbol interference during the transmission of signals from the far end) happens, the control unit 200 would stop the decision feedback equalizer of Port 1 from updating its filter coefficients because the decision feedback equalizer has a relatively stable response. Also, when the seed collision between A_NEXT A UNDER (the cross-port NEXT interference from Channel A of Port 2) and FE (the inter-symbol interference during the transmission of signals from the far end) happens, the control unit 200 would stop the decision feedback equalizer of Port 1 from updating its filter coefficients because the decision feedback equalizer has a relatively stable response.

(4) If Port 0 operates in the master mode and Port 1 and 2 operate in the slave mode, when the seed collision between A_NEXT A ABOVE (the cross-port NEXT interference from Channel A of Port 0) and FE (the inter-symbol interference during the transmission of signals from the far end) happens, the control unit 200 would stop the decision feedback equalizer of Port 1 from updating its filter coefficients because the decision feedback equalizer has a relatively stable response. Also, when the seed collision between A_NEXT A UNDER (the cross-port NEXT interference from Channel A of Port 2) and EC (the echo interference in Channel A of Port 1 itself) happens, the control unit 200 would stop the echo canceller of Port 1 from updating its filter coefficients because the echo canceller has a relatively stable response.

(5) If both Port 1 and 2 operate in the master mode and Port 0 operates in the slave mode, the control unit 200 would assign different seeds to Port 1 and 2 when the network apparatus 10 is turned on, so as to avoid seed collision at the very beginning. Also, when the seed collision between A_NEXT A ABOVE (the cross-port NEXT interference from Channel A of Port 0) and FE (the inter-symbol interference during the transmission of signals from the far end) happens, the control unit 200 would stop the decision feedback equalizer of Port 1 from updating its filter coefficients because the decision feedback equalizer has a relatively stable response.

(6) If Port 1 operates in the master mode and Port 0 and 2 operate in the slave mode, when the seed collision between A_NEXT A ABOVE (the cross-port NEXT interference from Channel A of Port 0) and FE (the inter-symbol interference during the transmission of signals from the far end) happens, the control unit 200 would stop the decision feedback equalizer of Port 1 from updating its filter coefficients because the decision feedback equalizer has a relatively stable response. Also, when the seed collision between A_NEXT A UNDER (the cross-port NEXT interference from Channel A of Port 2) and FE (the inter-symbol interference during the transmission of signals from the far end) happens, the control unit 200 would stop the decision feedback equalizer of Port 1 from updating its filter coefficients because the decision feedback equalizer has a relatively stable response.

(7) If Port 2 operates in the master mode and Port 0 and 1 operate in the slave mode, when the seed collision between A_NEXT A ABOVE (the cross-port NEXT interference from Channel A of Port 0) and EC (the echo interference in Channel A of Port 1 itself) happens, the control unit 200 would stop the echo canceller of Port 1 from updating its filter coefficients because the echo canceller has a relatively stable response. When the seed collision between A_NEXT B/C/D (the cross-port NEXT interference from Channel B/C/D of Port 0) and NEXT B/C/D (the NEXT interference from Channel B/C/D of Port 1) happens, the control unit 200 would stop the NEXT canceller of Port 1 from updating its filter coefficients because the NEXT canceller has a relatively stable response. Also, when the seed collision between A_NEXT A UNDER (the cross-port NEXT interference from Channel A of Port 2) and FE (the inter-symbol interference during the transmission of signals from the far end) happens, the control unit 200 would stop the decision feedback equalizer of Port 1 from updating its filter coefficients because the decision feedback equalizer has a relatively stable response.

(8) If all of Port 0, 1 and 2 operate in the slave mode, when the seed collision between A_NEXT A ABOVE (the cross-port NEXT interference from Channel A of Port 0) and EC (the echo interference in Channel A of Port 1 itself) happens, the control unit 200 would stop the echo canceller of Port 1 from updating its filter coefficients because the echo canceller has a relatively stable response. When the seed collision between A_NEXT B/C/D (the cross-port NEXT interference from Channel B/C/D of Port 0) and NEXT B/C/D (the NEXT interference from Channel B/C/D of Port 1) happens, the control unit 200 would stop the NEXT canceller of Port 1 from updating its filter coefficients because the NEXT canceller has a relatively stable response. Also, when the seed collision between A_NEXT A UNDER (the cross-port NEXT interference from Channel A of Port 2) and EC (the echo interference in Channel A of Port 1 itself) happens, the control unit 200 would stop the echo canceller of Port 1 from updating its filter coefficients because the echo canceller has a relatively stable response.

With regard to the above-recited conditions (6) and (8), it is almost impossible that two cross-port NEXT cancellers update their filter coefficients by the same data symbol (i.e. the seed collision happens there-between) at the very beginning of convergence. To restrain circuit complexity and development cost of the control unit 200, prevention of such seed collision may not been taken into consideration during circuit design of the control unit 200. Thus, the controlling mechanism of the control unit in the multi-port Gigabit Ethernet network apparatus can be summarized as: when more than two communication ports operate in the master mode, the control unit assigns different seeds to the more than two communication ports; when two neighboring communication ports respectively operates in the master and slave modes, the control unit stops the decision feedback equalizer from updating its filter coefficients during a pre-determined time interval; and when two neighboring communication ports operate in the slave mode, the control unit stops either the echo canceller or the NEXT canceller from updating their filter coefficients during a pre-determined time interval. Wherein, the above-mentioned pre-determined time interval may be more than 10 symbol durations and less than 30 symbol durations, depending on the real requirements.

Figure 5:
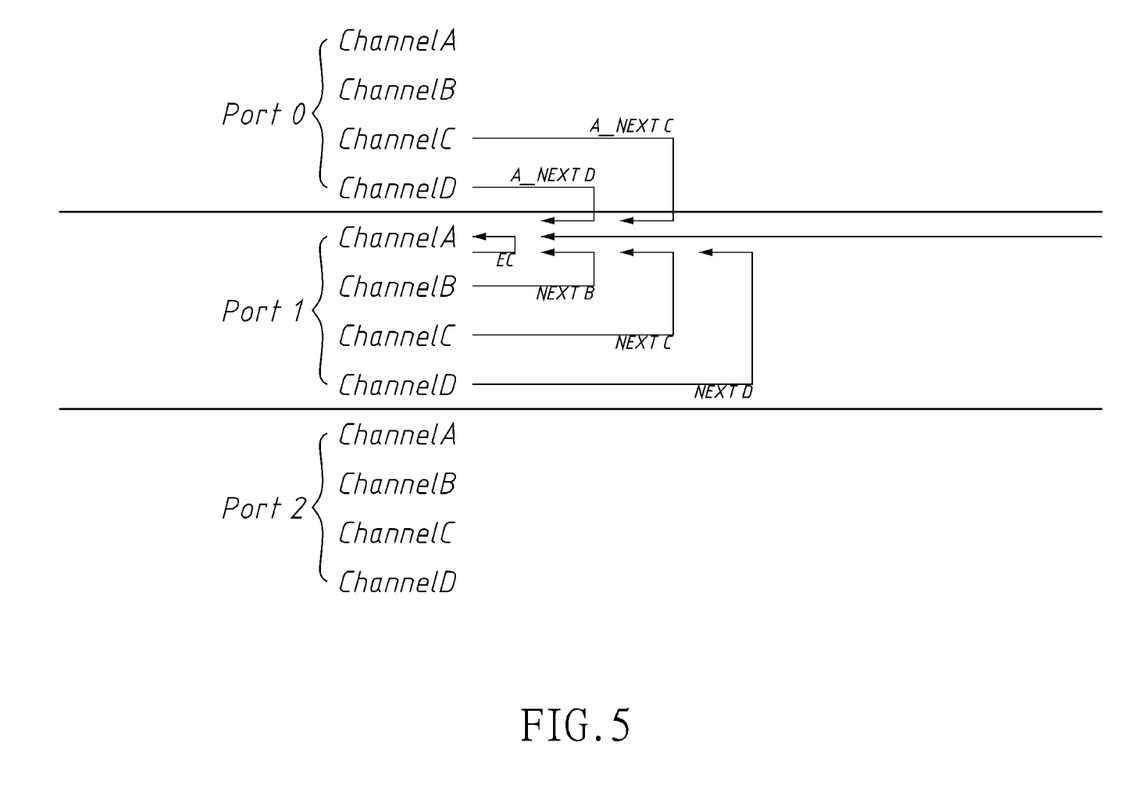
FIG. 5 shows a schematic diagram of possible interference sources in a real Gigabit Ethernet network apparatus.

Regarding the real applications of multi-port Gigabit Ethernet network, a channel is more interfered by its neighboring channels than by those distant from it. Also, Channel A of Port 1 is taken as an illustration in the following explanation. Practically, only echo interference (EC), NEXT interference (NEXT B/C/D) from the other channels (Channel B, C and D) of the same port (Port 1), cross-port NEXT interference (A_NEXT C/D) from Channel C and D of the other port (Port 0), and inter-symbol interference (FE) from the far-end signals are needed to be taken into consideration. FIG. 5 shows a schematic diagram of possible interference sources in the multi-port Gigabit Ethernet network, taking Channel A of Port 1 for example. Since each of the communication ports is operable either in a master mode or in a slave mode, we may have eight possible operation-mode combinations for three neighboring ports (Port 0, 1 and 2) as shown in FIG. 5. In the following paragraphs, solutions to fix the seed-collision problem are described in detail according to operation modes of Port 0, 1 and 2.

(1) If all of Port 0, 1 and 2 operate in the master mode, the control unit 200 would assign different seeds to each of Port 0, 1 and 2 when the network apparatus 10 is turned on, so as to avoid seed collision at the very beginning.

(2) If both Port 0 and 1 operate in the master mode and Port 2 operates in the slave mode, the control unit 200 would assign different seeds to Port 0 and 1 when the network apparatus 10 is turned on, so as to avoid seed collision at the very beginning.

(3) If both Port 0 and 2 operate in the master mode and Port 1 operates in the slave mode, the control unit 200 would assign different seeds to Port 0 and 2 when the network apparatus 10 is turned on, so as to avoid seed collision at the very beginning.

(4) If Port 0 operates in the master mode and Port 1 and 2 operate in the slave mode, the control unit 200 would have no need to do anything.

(5) If both Port 1 and 2 operate in the master mode and Port 0 operates in the slave mode, the control unit 200 would assign different seeds to Port 1 and 2 when the network apparatus 10 is turned on, so as to avoid seed collision at the very beginning.

(6) If Port 1 operates in the master mode and Port 0 and 2 operate in the slave mode, the control unit 200 would have no need to do anything.

(7) If Port 2 operates in the master mode and Port 0 and 1 operate in the slave mode, when the seed collision between A_NEXT C/D (the cross-port NEXT interference from Channel C and/or D of Port 0) and NEXT C/D (the NEXT interference from Channel C and/or D of Port 1) happens, the control unit 200 would stop the NEXT canceller of Port 1 from updating its filter coefficients because the NEXT canceller has a relatively stable response.

(8) If all of Port 0, 1 and 2 operate in the slave mode, when the seed collision between A_NEXT C/D (the cross-port NEXT interference from Channel C and/or D of Port 0) and NEXT C/D (the NEXT interference from Channel C and/or D of Port 1) happens, the control unit 200 would stop the NEXT canceller of Port 1 from updating its filter coefficients because the NEXT canceller has a relatively stable response.

As a result, the controlling mechanism of the control unit in a real multi-port Gigabit Ethernet network apparatus can be summarized as: when more than two communication ports operate in the master mode, the control unit assigns different seeds to the more than two communication ports; and when two neighboring communication ports operate in the slave mode, the control unit stops the NEXT canceller from updating their filter coefficients during a pre-determined time interval. Wherein, the above-mentioned pre-determined time interval may be more than 10 symbol durations and less than 30 symbol durations, depending on the real requirements. Thus, the circuit complexity and development cost of the control unit 200 can be further lowered.

Figure 6:
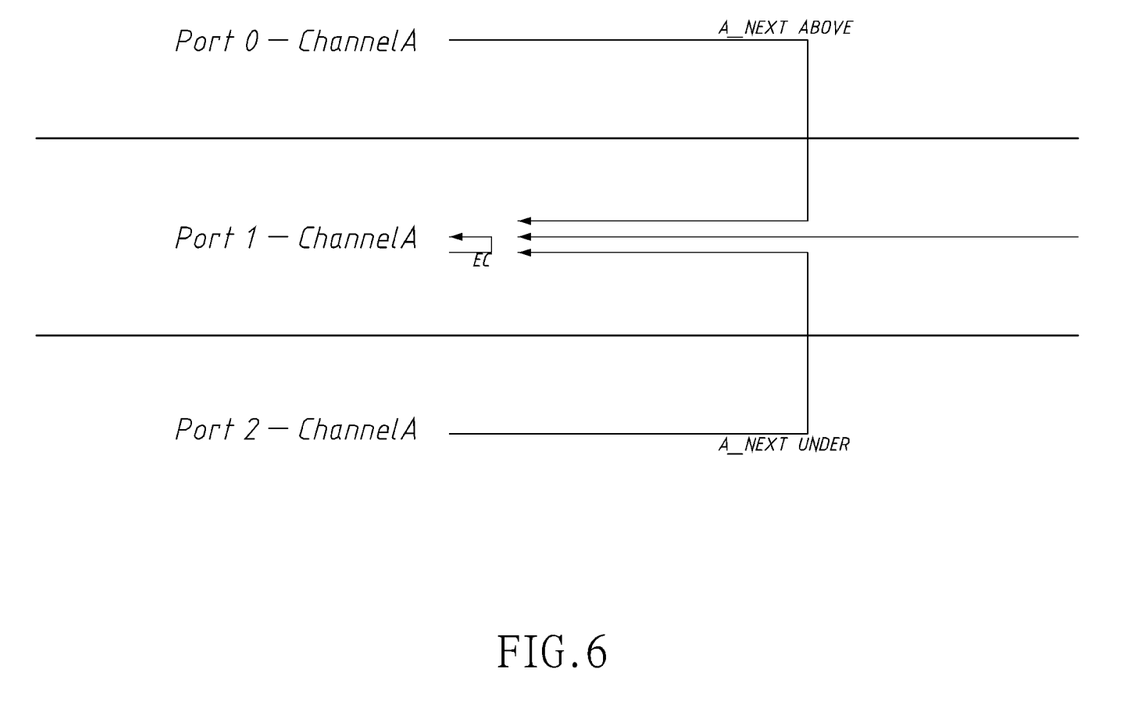
FIG. 6 shows a schematic diagram of possible interference sources in the automotive BRPHY Ethernet network apparatus.

In a second embodiment, the network apparatus 10 of the present disclosure can be applied to the multi-port automotive BRPHY Ethernet network. The network apparatus 10 may have three communication ports (Port 0, 1 and 2, as shown in FIG. 6) with only one channel (Channel A). Each of the communication ports can operate in either a master mode or a slave mode. FIG. 6 shows a schematic diagram of possible interference sources in the network apparatus 10, taking Port 1 as an illustration. The interference may come from either the communication ports of near end or the noise signals transmitted from the far ends. As shown in FIG. 6, EC denotes echo interference that is the interference caused by an echo signal from the communication port itself, e.g. the signal transmitted from Channel A of Port 1 may be partly returned to the same channel (Channel A of Port 1) to be the above-recited "echo signal", which would be a noise to interfere in the same channel. A_NEXT A ABOVE/UNDER denote cross-port NEXT interference that is the interference of noise signals from the other ports (Port 0 and 2), e.g. the signals transmitted from Channel A of Port 0 and 2 may respectively cause undesirable cross-talk noises to interfere in Channel A of Port 1 at the same end of the system. FE denotes the inter-symbol interference due to the transmission of far-end signals, e.g. the signals transmitted from the other ends of the system, being inter-symbol interfered during their transmission from the other ends to the current end. Since each of the communication ports is operable either in a master mode or in a slave mode, we may have eight possible operation-mode combinations for three neighboring ports (Port 0, 1 and 2) as shown in FIG. 6. In the following paragraphs, solutions to fix the seed-collision problem are described in detail according to operation modes of Port 0, 1 and 2.

(1) If all of Port 0, 1 and 2 operate in the master mode, the control unit 200 would assign different seeds to each of Port 0, 1 and 2 when the network apparatus 10 is turned on, so as to avoid seed collision at the very beginning.

(2) If both Port 0 and 1 operate in the master mode and Port 2 operates in the slave mode, the control unit 200 would assign different seeds to Port 0 and 1 when the network apparatus 10 is turned on, so as to avoid seed collision at the very beginning. Also, when the seed collision between A_NEXT A ABOVE (the cross-port NEXT interference from Channel A of Port 2) and FE (the inter-symbol interference during the transmission of signals from the far end) happens, the control unit 200 would stop the decision feedback equalizer of Port 1 from updating its filter coefficients because the decision feedback equalizer has a relatively stable response.

(3) If both Port 0 and 2 operate in the master mode and Port 1 operates in the slave mode, the control unit 200 would assign different seeds to Port 0 and 2 when the network apparatus 10 is turned on, so as to avoid seed collision at the very beginning. When the seed collision between A_NEXT A ABOVE (the cross-port NEXT interference from Channel A of Port 2) and FE (the inter-symbol interference during the transmission of signals from the far end) happens, the control unit 200 would stop the decision feedback equalizer of Port 1 from updating its filter coefficients because the decision feedback equalizer has a relatively stable response. Also, when the seed collision between A_NEXT A UNDER (the cross-port NEXT interference from Channel A of Port 2) and FE (the inter-symbol interference during the transmission of signals from the far end) happens, the control unit 200 would stop the decision feedback equalizer of Port 1 from updating its filter coefficients because the decision feedback equalizer has a relatively stable response.

(4) If Port 0 operates in the master mode and Port 1 and 2 operate in the slave mode, when the seed collision between A_NEXT A ABOVE (the cross-port NEXT interference from Channel A of Port 0) and FE (the inter-symbol interference during the transmission of signals from the far end) happens, the control unit 200 would stop the decision feedback equalizer of Port 1 from updating its filter coefficients because the decision feedback equalizer has a relatively stable response. Also, when the seed collision between A_NEXT A UNDER (the cross-port NEXT interference from Channel A of Port 2) and EC (the echo interference in Channel A of Port 1 itself) happens, the control unit 200 would stop the echo canceller of Port 1 from updating its filter coefficients because the echo canceller has a relatively stable response.

(5) If both Port 1 and 2 operate in the master mode and Port 0 operates in the slave mode, the control unit 200 would assign different seeds to Port 1 and 2 when the network apparatus 10 is turned on, so as to avoid seed collision at the very beginning. Also, when the seed collision between A_NEXT A ABOVE (the cross-port NEXT interference from Channel A of Port 0) and FE (the inter-symbol interference during the transmission of signals from the far end) happens, the control unit 200 would stop the decision feedback equalizer of Port 1 from updating its filter coefficients because the decision feedback equalizer has a relatively stable response.

(6) If Port 1 operates in the master mode and Port 0 and 2 operate in the slave mode, when the seed collision between A_NEXT A ABOVE (the cross-port NEXT interference from Channel A of Port 0) and FE (the inter-symbol interference during the transmission of signals from the far end) happens, the control unit 200 would stop the decision feedback equalizer of Port 1 from updating its filter coefficients because the decision feedback equalizer has a relatively stable response. Also, when the seed collision between A_NEXT A UNDER (the cross-port NEXT interference from Channel A of Port 2) and FE (the inter-symbol interference during the transmission of signals from the far end) happens, the control unit 200 would stop the decision feedback equalizer of Port 1 from updating its filter coefficients because the decision feedback equalizer has a relatively stable response.

(7) If Port 2 operates in the master mode and Port 0 and 1 operate in the slave mode, when the seed collision between A_NEXT A ABOVE (the cross-port NEXT interference from Channel A of Port 0) and EC (the echo interference in Channel A of Port 1 itself) happens, the control unit 200 would stop the echo canceller of Port 1 from updating its filter coefficients because the echo canceller has a relatively stable response. Also, when the seed collision between A_NEXT A UNDER (the cross-port NEXT interference from Channel A of Port 2) and FE (the inter-symbol interference during the transmission of signals from the far end) happens, the control unit 200 would stop the decision feedback equalizer of Port 1 from updating its filter coefficients because the decision feedback equalizer has a relatively stable response.

(8) If all of Port 0, 1 and 2 operate in the slave mode, when the seed collision between A_NEXT A ABOVE (the cross-port NEXT interference from Channel A of Port 0) and EC (the echo interference in Channel A of Port 1 itself) happens, the control unit 200 would stop the echo canceller of Port 1 from updating its filter coefficients because the echo canceller has a relatively stable response. Also, when the seed collision between A_NEXT A UNDER (the cross-port NEXT interference from Channel A of Port 2) and EC (the echo interference in Channel A of Port 1 itself) happens, the control unit 200 would stop the echo canceller of Port 1 from updating its filter coefficients because the echo canceller has a relatively stable response.

With regard to the above-recited conditions (6) and (8), it is almost impossible that two cross-port NEXT cancellers update their filter coefficients by the same data symbol (i.e. the seed collision happens there-between) at the very beginning of convergence. To restrain circuit complexity and development cost of the control unit 200, prevention of such seed collision may not been taken into consideration during circuit design of the control unit 200. Thus, the controlling mechanism of the control unit in the automotive BRPHY Ethernet network apparatus can be summarized as: when more than two communication ports operate in the master mode, the control unit assigns different seeds to the more than two communication ports; when two neighboring communication ports respectively operates in the master and slave modes, the control unit stops the decision feedback equalizer from updating its filter coefficients during a pre-determined time interval; and when two neighboring communication ports operate in the slave mode, the control unit stops the echo canceller from updating their filter coefficients during a pre-determined time interval. Wherein, the above-mentioned pre-determined time interval may be more than 10 symbol durations and less than 30 symbol durations, depending on the real requirements.

Figure 7:
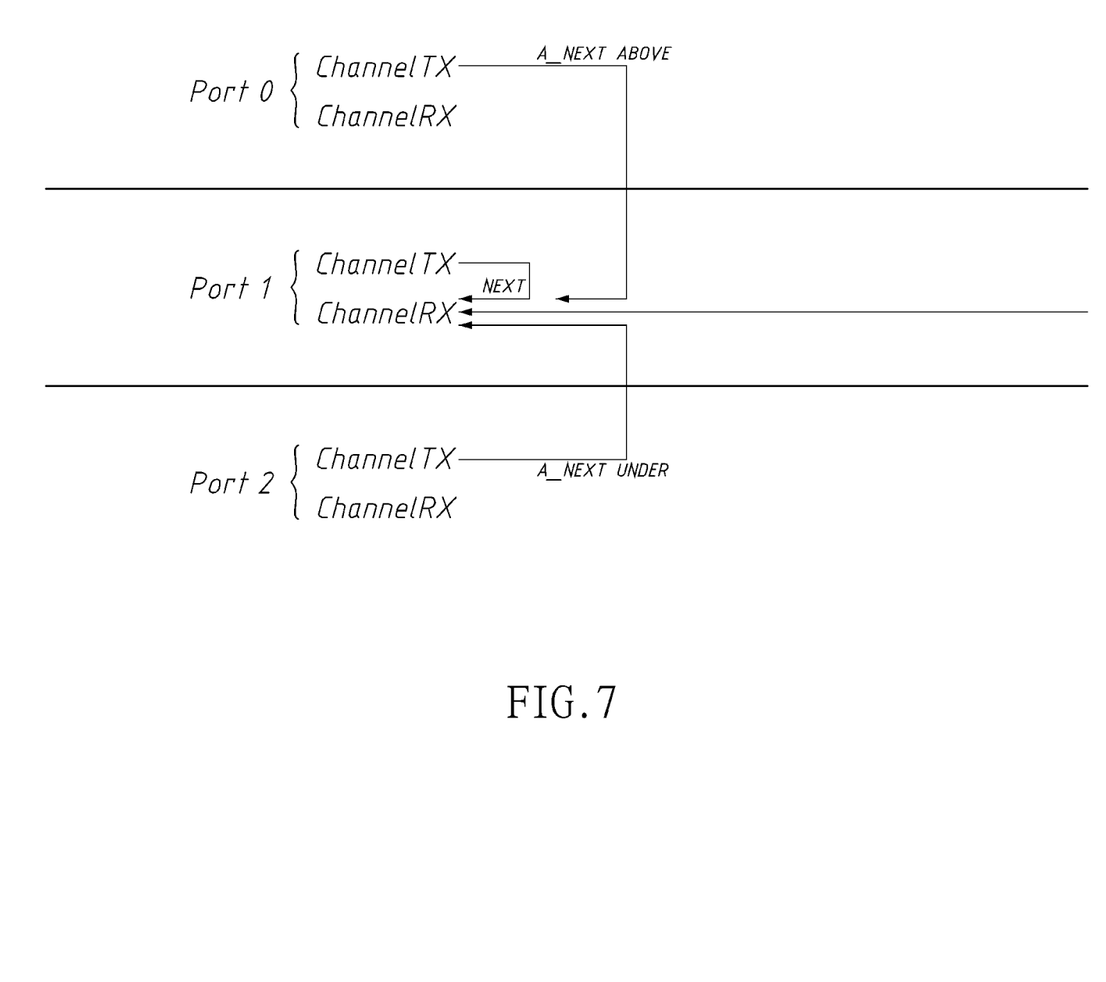
FIG. 7 shows a schematic diagram of possible interference sources in the fast Ethernet network apparatus.

In a third embodiment, the network apparatus 10 of the present disclosure can be applied to the multi-port fast Ethernet network. The network apparatus 10 may have three communication ports (Port 0, 1 and 2, as shown in FIG. 7), each of which has a transmitting channel TX and a receiving channel RX. FIG. 7 shows a schematic diagram of possible interference sources in the network apparatus 10, taking the receiving channel RX of Port 1 as an illustration. The interference may come from either the communication ports of near end or the noise signals transmitted from the far ends. As shown in FIG. 7, NEXT denote near-end cross-talk interference that is the interference of noise signals from the other channel (channel TX) of the same port (Port 1). A_NEXT ABOVE/UNDER denotes cross-port NEXT interference that is the interference of noise signals from the other ports (Port 0 and 2). FE denotes the inter-symbol interference due to the transmission of far-end signals. In the following paragraphs, solutions to fix the seed-collision problem are described in detail according to operation modes of Port 0, 1 and 2.

(1) When the network apparatus 10 is turned on, the control unit 200 would assign different seeds to each of Port 0, 1 and 2, so as to avoid seed collision at the very beginning.

(2) When the seed collision between A_NEXT ABOVE (the cross-port NEXT interference from the channel TX of Port 0) and FE (the inter-symbol interference during the transmission of signals from the far end) happens, the control unit 200 would stop the decision feedback equalizer of Port 1 from updating its filter coefficients because the decision feedback equalizer has a relatively stable response.

(3) When the seed collision between A_NEXT UNDER (the cross-port NEXT interference from the channel TX of Port 2) and FE (the inter-symbol interference during the transmission of signals from the far end) happens, the control unit 200 would stop the decision feedback equalizer of Port 1 from updating its filter coefficients because the decision feedback equalizer has a relatively stable response.

(4) When the seed collision between NEXT (the NEXT interference from the channel TX of Port 1) and FE (the inter-symbol interference during the transmission of signals from the far end) happens, the control unit 200 would stop the decision feedback equalizer of Port 1 from updating its filter coefficients because the decision feedback equalizer has a relatively stable response.

As a result, the controlling mechanism of the control unit in a real multi-port fast Ethernet network apparatus can be summarized as: the control unit assigns different seeds to the more than two communication ports and stops the decision feedback equalizer from updating their filter coefficients during a pre-determined time interval. Wherein, the above-mentioned pre-determined time interval may be more than 10 symbol durations and less than 30 symbol durations, depending on the real requirements.

The network apparatus according to this present disclosure thus can perform cancelling of the cross clock domain interference among different communication ports. With respect to the above description then, it is to be realized that the optimum dimensional relationships for the parts of the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present disclosure.

What is claimed is:

1. A network apparatus with multiple communication ports, each of which is connected to multiple channels, assigned a seed for eliminating the interference among the communication ports, and operable in either a master mode or a slave mode, each of the channels having a communication unit which comprises:

an echo canceller being a first filter with multiple taps corresponding to multiple first coefficients so as to eliminate the interference of an echo signal from the channel itself;

a near-end crosstalk (NEXT) canceller being a second filter with multiple taps corresponding to multiple second coefficients so as to eliminate the interference of crosstalk noise from another channel of the communication port itself;

a decision feedback equalizer being a third filter with multiple taps corresponding to multiple third coefficients so as to eliminate the inter-symbol interference due to the transmission of far-end signals; and a control unit configured for controlling the communication ports if the echo canceller keeps updating the first coefficients and the decision feedback equalizer keeps updating the third coefficients according to the same symbol during a first pre-determined time interval;

wherein when more than two of the communication ports operate in the master mode, the control unit assigns different seeds to the more than two communication ports; and wherein when successive two of the communication ports operate in the slave mode, the control unit stops either the echo canceller from updating the first coefficients or the NEXT canceller from updating the second coefficients during a second pre-determined time interval.

2. The network apparatus according to claim 1, wherein each of the echo canceller and the NEXT canceller comprises a finite impulse response (FIR) filter.

3. The network apparatus according to claim 1, wherein the decision feedback equalizer comprises an FIR filter and an infinite impulse response (IIR) filter.

4. The network apparatus according to claim 1, wherein the seed comprises a periodic pseudo-noise sequence.

5. The network apparatus according to claim 1, wherein the control unit stops the NEXT canceller from updating the second coefficients during the second pre-determined time interval when successive two of the communication ports operate in the slave mode.

6. The network apparatus according to claim 1, wherein when one of successive two of the communication ports operates in the master mode and the other one operates in the slave mode, the control unit stops the decision feedback equalizer from updating the third coefficients during a third pre-determined time interval.

* * * * *